(12) United States Patent
He et al.

(10) Patent No.: US 12,657,207 B2
(45) Date of Patent: Jun. 16, 2026

(54) METHODS AND SYSTEMS FOR REPLICATED STATE MACHINE TRANSITION

(71) Applicant: ConcurSys Inc., Westfield, NJ (US)

(72) Inventors: Zhenfeng He, Westfield, NJ (US); Tomislav Grospic, Zagreb (HR)

( * ) Notice: Subject to any disclaimer, the term of this patent is extended or adjusted under 35 U.S.C. 154(b) by 0 days.

(21) Appl. No.: 18/624,101

(22) Filed: Apr. 1, 2024

(65) Prior Publication Data

US 2025/0307264 A1 Oct. 2, 2025

(51) Int. Cl.
G06F 16/27 (2019.01)
G06F 16/23 (2019.01)

(52) U.S. Cl.
CPC ........ G06F 16/273 (2019.01); G06F 16/2365 (2019.01)

(58) Field of Classification Search
CPC ........................... G06F 16/2365; G06F 16/273
USPC ......................................................... 707/615
See application file for complete search history.

(56) References Cited

U.S. PATENT DOCUMENTS 11,599,520 B1 * 3/2023 Vermeulen .............. G06F 9/466
12,062,037 B1 * 8/2024 Coventry .............. H04L 9/0825
2020/0133955 A1 * 4/2020 Padmanabhan ........ G06Q 30/01

* cited by examiner

*Primary Examiner* — Ajay M Bhatia
*Assistant Examiner* — Lauren Zannah Ganger

(57) ABSTRACT

The present disclosure presents methods and architectures that allow non-deterministic concurrent executions that can potentially interleave with other executions and replays in a SMR system. The current disclosure further discloses architectures and methods that executes, validates (replay) then merges transactions without the need to first order the transactions therefore achieves higher throughput. Another aspect of the invention involves organizing SM state as a Multi-Version Concurrency Control (MVCC) database with all concurrent execution/replay generating operation logs on each resource. This disclosure additionally outlines methods for integrating client nodes with State Machine Replication (SMR) systems. This disclosure further provides improved Directed Acyclic Graph (DAG) based consensus protocols.

11 Claims, 10 Drawing Sheets

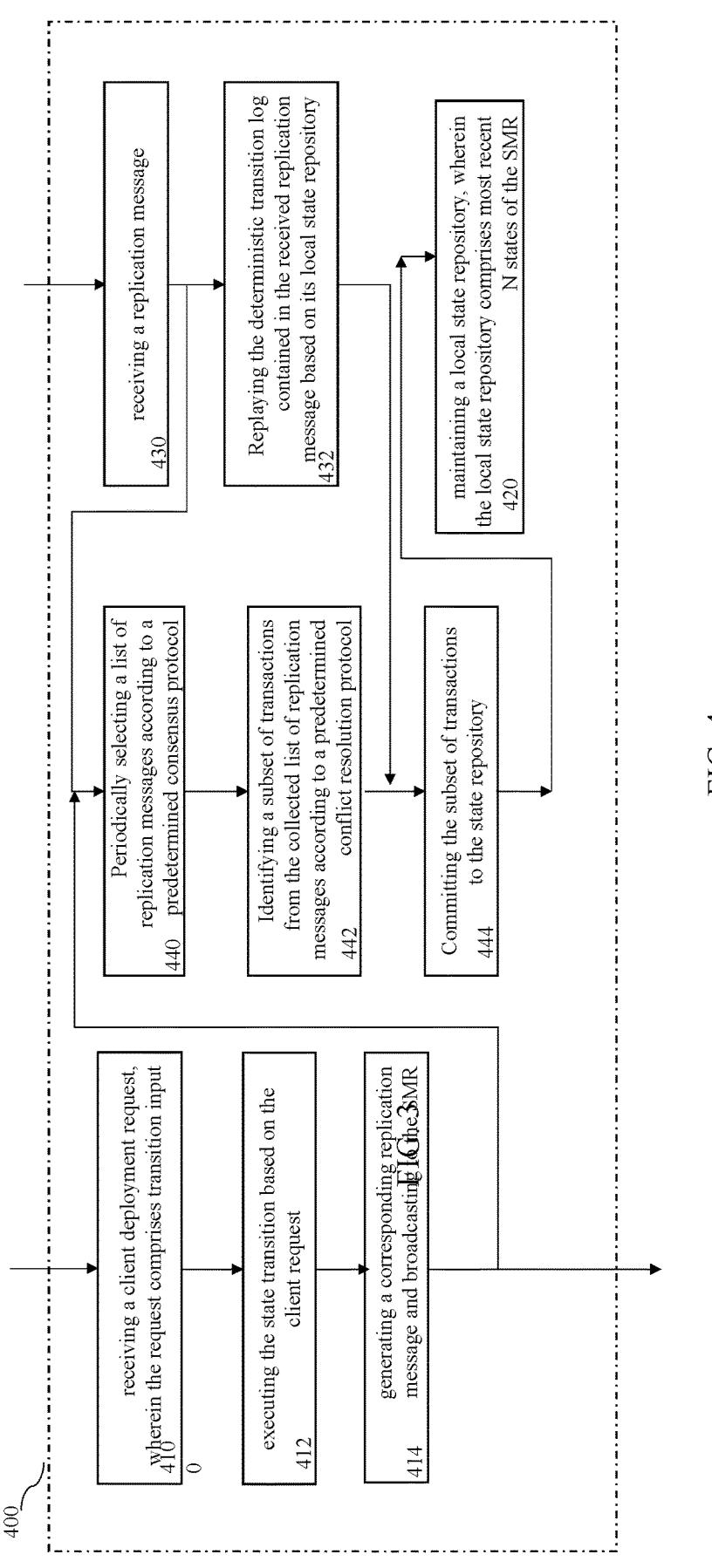

FIG. 4 receiving a replication message

430

Replaying the deterministic transition log contained in the received replication message based on its local state repository

432 maintaining a local state repository, wherein the local state repository comprises most recent N states of the SMR

420

Periodically selecting a list of replication messages according to a predetermined consensus protocol

440

Identifying a subset of transactions from the collected list of replication messages according to a predetermined conflict resolution protocol

442

Committing the subset of transactions to the state repository

444 receiving a client deployment request, wherein the request comprises transition input

410 executing the state transition based on the client request

412 generating a corresponding replication message and broadcasting to the SMR

414

400

METHODS AND SYSTEMS FOR REPLICATED STATE MACHINE TRANSITION

FIELD OF THE INVENTION

The invention described in this application relates to the field of replicated state machines technology, specifically involving a concurrent state machine transition method that allows for non-deterministic concurrent executions.

BACKGROUND OF THE INVENTION

State machine replication (SMR) is a pivotal mechanism in the realm of distributed networks, finding applications in varied systems such as distributed databases, shared storage solutions, and blockchains. It underpins fault tolerance, a critical attribute for ensuring that these systems remain robust and operational even when some nodes fail. This involves replicating an abstract model—the state machine—that encapsulates the system's possible states and the transitions between them triggered by external inputs.

The essence of SMR lies in distributing identical copies of the state machine across multiple nodes within the network. These nodes, interconnected, act as the functional units that process client requests, such as transactions in a database. When a request is made, the nodes execute the necessary operations and transition to new states as required, ensuring the system's responsiveness and continuity.

For maintaining network-wide consistency, the nodes engage in continuous communication (e.g., replay messages), exchanging information about state transitions and performed actions. This exchange is facilitated by consensus protocols, which are sets of rules or algorithms designed to achieve unanimity among nodes regarding the system's state, even in instances of node failures or data discrepancies.

The combination of state machine replication across nodes and their synchronization through consensus protocols establishes a foundation for fault tolerance. It enables the system to withstand and recuperate from certain failures, ensuring uninterrupted service. Essentially, the replication process and consensus-driven synchronization safeguard the system's operational integrity and consistency, thus maintaining seamless service delivery despite potential disruptions.

This streamlined approach to fault tolerance through SMR enhances clarity, removing redundancy and focusing on the core processes that ensure distributed networks remain robust and reliable.

Using a database application as an example, each replicate node's state is the current database state, whereas a user transaction input may be a database query or update request, and the transition function is the defined database update semantics.

Blockchain is another example of the application of SMR. FIG. 1 illustrates a typical operation flow of a blockchain application using SMR. First, transactions ($Tx_{input\ 1}$, $Tx_{input\ 2}$, . . . , $Tx_{input\ n}$) are ordered by consensus. Then each replica node executes the ordered transactions. In some variations, the transactions (Txs) are ordered such that they are executed sequentially, as shown in FIG. 1. At state t, after the execution of ordered $Tx_{input\ 1}$, the state t becomes state t+1. After the execution of $Tx_{input\ 2}$, state t+1 is updated to state t+2. Ater the execution on $Tx_{input\ 3}$, state t+2 is updated to state t+3. And so on. It is noted that in some variations not illustrated in FIG. 1, transactions (Txs) can be partially ordered. This ordering facilitates parallel processing by the replica nodes. This method, along with similar State Machine Replication (SMR) strategies, typically involves sequencing the transactions before executing them.

An alternative approach involves executing transactions as requested before ordering them. A known example of this method is IBM's Hyperledger. Transactions are executed in any order, potentially even simultaneously, using chain code. Once a consensus is reached among enough peers on a transaction's outcome, it is recorded in the ledger and shared with all peers. It is at this point that transactions are ordered for the first time; until then, transactions lack a sequential context. Subsequently, each peer validates and processes the transactions chronologically. With the transactions now organized, peers can identify if a later transaction is invalidated by a prior one, effectively preventing issues like double-spending. For a comprehensive explanation of this approach, please see the URL https://medium.com/kokster/hyperledger-fabric-endorsing-transactions-3c1b7251a709.

Despite differences in the order of transaction ordering and execution, both traditional approaches discussed above encounter similar challenges. These methods struggle in environments where state transitions occur concurrently and within highly asynchronous networks. Typically, each node under these approaches maintains only a single copy of the most recent state. Consequently, when a transaction input is received without specifying the intended state to be applied, a replica node defaults to applying this input to the latest state it holds.

Moreover, while replay messages might include the transition input and deterministic replay information, they often fail to clearly indicate the target state for the transition. This lack of specificity stems from each node holding a single state version, leading to potential inconsistencies due to network latency. Although nodes may eventually achieve synchronization and consistency, the process is fraught with challenges.

Furthermore, these approaches frequently result in non-deterministic state transitions, conducted in a manner that interleaves with other transitions. To ensure other nodes can deterministically replay these transitions, a replay log tailored to a specific state is usually required, highlighting the limitations of existing solutions.

RChain emerges as a blockchain platform with innovative features aimed at overcoming some of the scalability and efficiency issues inherent in traditional blockchain and distributed network applications, including state machine replication challenges. It introduces the Rho Virtual Machine (RhoVM), designed for concurrent execution of smart contracts—a notable shift from the single-threaded models prevalent in many existing systems. This capability to process multiple smart contracts in parallel seeks to enhance throughput and alleviate sequential execution bottlenecks.

Additionally, RChain adopts a namespace architecture that categorizes and processes transactions within distinct namespaces. This structure allows for more precise control and delineation of transaction contexts, addressing the problem of applying transactions to vague or unintended states.

However, RChain's approach to replay messages—which include a start state ID and execution results (the complete Read/Write set)—allows other validators to perform deterministic replays. Despite this, Rchain's method of applying executions and replays directly to its state, necessitating the broadcast of the entire execution result, indicates its optimization for parallel rather than concurrent computing. This distinction points to a remaining gap in addressing interactions between transactions during execution and replay phases.

Considering these observations, there is a clear demand for new methods and systems capable of addressing the aforementioned challenges. Such innovations are crucial for improving the efficiency and reliability of distributed network applications, especially where state machine replications are involved.

SUMMARY OF THE INVENTION

The present disclosure presents an architecture that allows non-deterministic concurrent executions that can interleave with other executions and replays. The replay logs are much lighter because there is no need to broadcast the whole execution result.

The current disclosure discusses architectures and methods that executes, validates (replay) then merges transactions without the need to first order the transactions therefore achieves higher throughput.

Another aspect of the invention involves organizing SM state as a Multi-Version Concurrency Control (MVCC) database with all concurrent execution/replay generating new versions of data and associated operation logs on each resource. With the help of an MVCC database, the replay log according to the present disclosure is much lighter—only a tiny replay log that contains the non-deterministic execution is required. Transactions during execution can see other transactions' update to the resource and choose execution schedules to avoid conflicts. Conflict resolvers can analyze the operation logs at resource level. It allows the executor to detect conflicts during execution by looking at the resource's operation logs. Conflicts stem from concurrent transactions accessing or modifying the same resource. Detecting these, the executor may abort and retry transactions early based on insights learned from the logs. Therefore it can save computation by preempting likely failed transactions, curbing resource waste.

This disclosure additionally outlines methods for integrating client nodes with State Machine Replication (SMR) systems.

This disclosure further provides improved Directed Acyclic Graph (DAG) based consensus protocols, offering substantial benefits in computational efficiency and system throughput.

The advantages of the invention will become apparent to those skilled in the art based on the following drawings and detailed descriptions.

BRIEF DESCRIPTION OF THE DRAWINGS

One or more embodiments are exemplified through the images in the corresponding drawings. These illustrations do not limit the scope of the embodiments, and elements with the same reference numbers in the drawings are similar elements, unless specifically stated otherwise. The drawings are not necessarily to scale.

FIG. 4 illustrates a method of executing and committing transactions without ordering at a replica node of a SMR system according to some aspects of the present invention.

DETAILED DESCRIPTION

To make the objectives, technical solutions, and advantages of this application's embodiment clearer, a detailed explanation will be provided in conjunction with the accompanying drawings. However, it is understandable to those skilled in the art that numerous technical details are included in these embodiments to enhance the reader's understanding of the application. Despite this, the technical solutions sought to be protected by this application can still be realized, even without these technical details and through various alterations and modifications based on the following embodiments.

The various embodiments are described for ease of description and do not limit the specific implementations of this application. They can be combined and referenced interchangeably, provided there are no contradictions.

In a SMR system, the architecture is designed to ensure consistency and reliability across distributed nodes. The system typically consists of multiple replica nodes that work together to maintain a consistent state. Here's an overview of the replica node architecture in SMR and the counterpart elements within such a system:

Replica Node Architecture in SMR

Replica nodes are the fundamental components of an SMR system. Each replica node maintains a copy of the state machine and processes the same sequence of operations. The idea is that even if some nodes fail, the system continues to operate correctly. In some SMR systems (like those using the Paxos or Raft algorithms), one node acts as the leader or primary. It is responsible for coordinating the operation order and disseminating information to other nodes. Followers or secondaries nodes receive operations from the leader and execute them in the same order. They are crucial for redundancy and ensuring high availability.

Consensus Module is integral to the architecture, ensuring that all replicas agree on the order and result of operations. The consensus mechanism can vary (Paxos, Raft, View stamped Replication, etc.).

Replica nodes typically implement logging (like write-ahead logging) and periodic checkpointing to facilitate recovery and maintain data integrity.

Counterparts to replica nodes in a SMR may include client nodes, load balancers or coordinators and observer nodes. Client nodes are the nodes or entities that interact with the replica nodes. Clients send requests (like transactions or queries) to the replica nodes. In response, the replica nodes execute these requests and maintain their state accordingly.

In some systems, there might be additional components like load balancers or coordinators that distribute client requests among the replica nodes to balance the load and optimize performance. Certain SMR implementations include nodes that observe the operation of the system but do not actively participate in the consensus. They are used to increase fault tolerance or to provide read-only access to the system's state.

Figure 1:
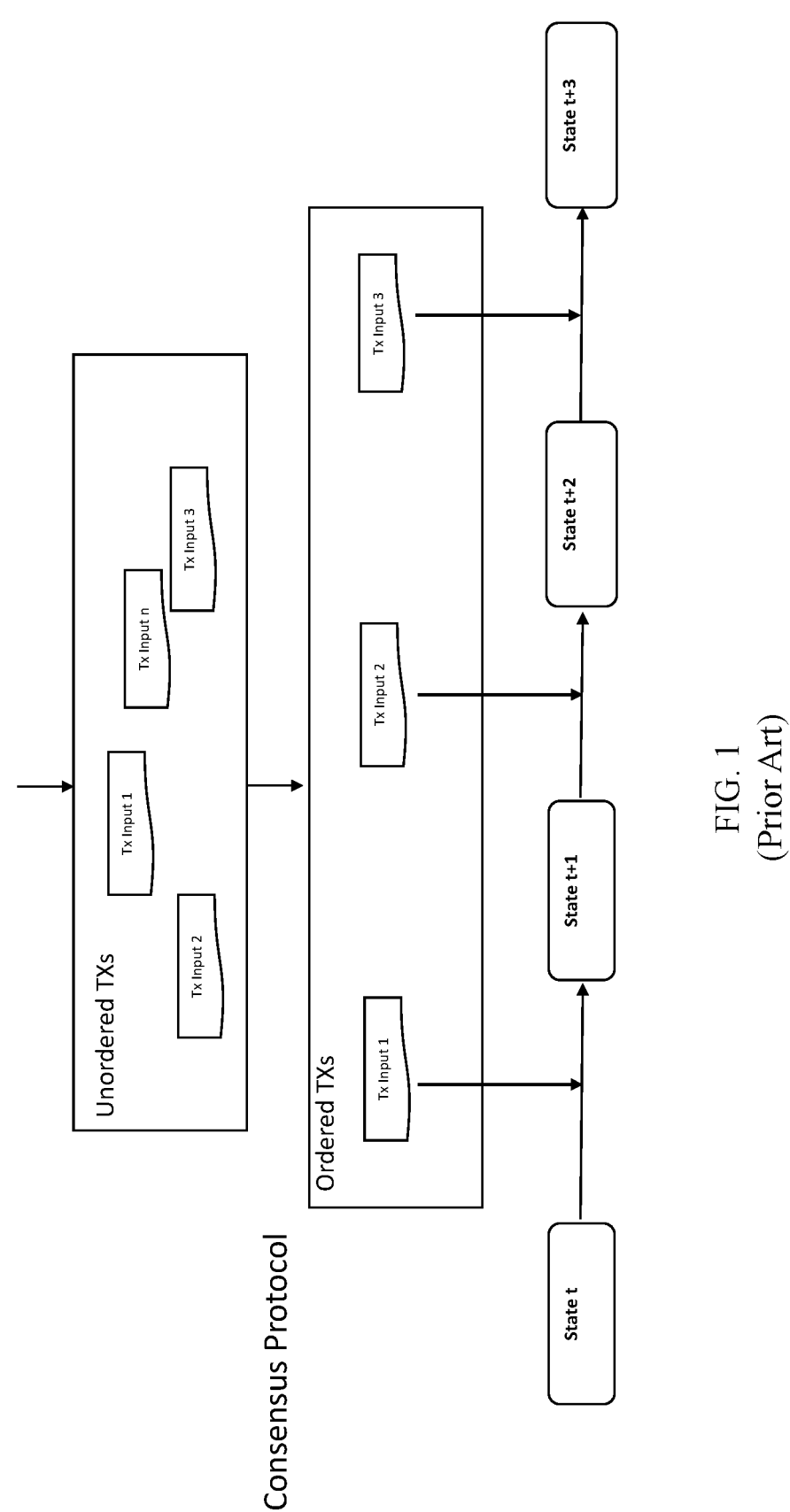
FIG. 1 illustrates a typical operation flow of a blockchain application using SMR.
Figure 2:
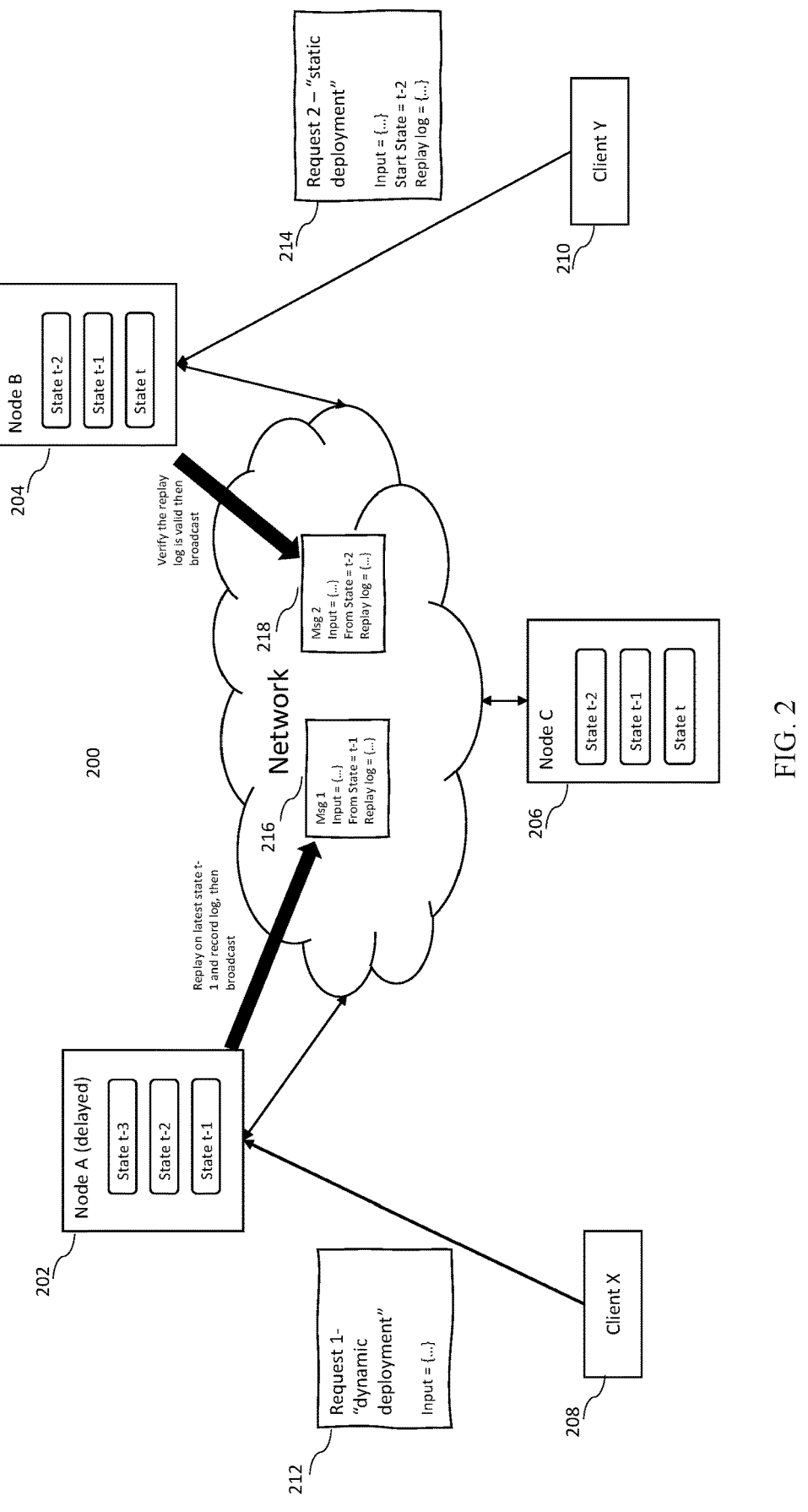
FIG. 2 illustrates a system setup for the application of the architecture and methods disclosed in the present disclosure.

FIG. 2 illustrates a state machine replication system setup for applying the architecture and methods disclosed in the present invention. This illustration identifies various essential components that will be elaborated upon in subsequent detailed discussions. Within a distributed framework, labeled as System 200, multiple nodes operate, including Node A (202), Node B (204), and Node C (206). Each node maintains a local state repository. However, these repositories may not be identical across nodes due to network latency. For example, Node A's state repository may maintain a delayed state status including its last 3 states (State t−1, State t−2, and State t−3), while Nodes B and C may maintain up-to-date state status including last three states (State t, State t−1, and State t−2).

System 200 allows user access via one or more clients, for instance, Client X (208) and Client Y (210), each sending distinct types of client deployment requests. As depicted, Client X (208) issues a client dynamic deployment request (212) to Node A (202), characterized by its inclusion of transaction inputs. Client Y (210) directs a client static deployment request (214) to Node B (204), which, unlike the client dynamic deployment request, specifies a start state ID (e.g., t−2) and includes a replay log alongside the transaction inputs.

In FIG. 2, When Node A receives the client dynamic deployment request from Client X, it retrieves the relevant states from its repository, executes operations based on those states, record replay logs, writes operation logs, and then sends out a replication message (216) to the network. This replication message includes the user input from Client X, the start state ID (state t−1), and a deterministic replay log. This log contains information aimed at eliminating the uncertainty that arises from concurrent execution. It also enables other nodes in System 200 to accurately replicate the state transition.

Concurrently or at a different time, Node B (204) receives a client static deployment request (214) from Client Y (210). This request (214) also includes transaction inputs, a start state ID (e.g., t−2), and a deterministic replay log created by Client Y. Node B then executes and verifies the operations as per the replay log before broadcasting its own replication message (218) to the network. This message similarly includes the transition input, start state ID (e.g., t−2), and a deterministic replay log, facilitating accurate replication across nodes.

In some embodiment of an SMR system, all operation logs used to record operations in the MVCC are stored in memory without being written to disk. In some other embodiment of an SMR system, some of the operation logs are WALs written to disk.

Figure 3:
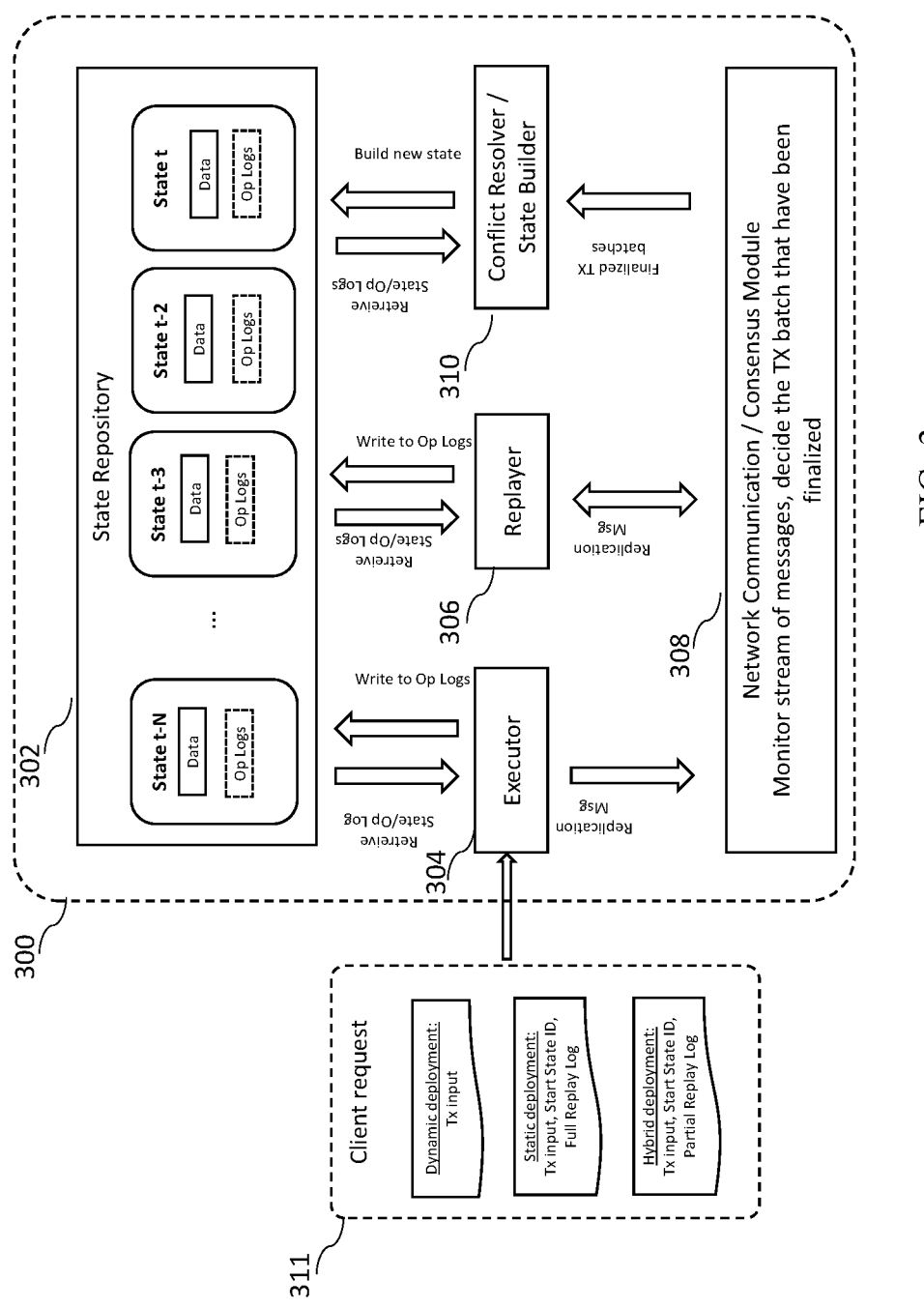
FIG. 3 illustrates a replica node architecture according to some aspects of the present invention.

FIG. 3 illustrates a replica node architecture 300 that may be implemented in a distributed network system 200 as described above according to some aspects of the present invention. This replica node 300 of a distributed network system comprises a state repository 302, an executor 304, a re-player 306, a conflict resolver 310 and a consensus module 308. It should be appreciated that the layout of these different modules is merely exemplary and may take on any other suitable layout or configuration.

State repository 302 maintains a database for N recent states of the system. Each state (t, t−1, t−2, t−3 . . . , t−N) includes an operation log for the corresponding state. According to some embodiment, the operation log is a write ahead log.

In some embodiments according to the present invention, state repository 302 is preferably organized as multi-version database, with all concurrent execution/replay generating operation logs for each resource of the system. With the help of an MVCC database, the replay operation log is much lighter—there is no need to broadcast the whole execution result. Other nodes only need this small replay operation log containing non-deterministic executions to replicate accurately. This approach allows concurrent computing where transactions can interact with each other during execution/replay. Because, with the help of an MVCC database, transactions during execution can see other transaction's update to the resource and choose execution schedules to avoid conflicts.

According to some embodiments of the present disclosure, Executor 304 is configured to perform several operations depending on a client deployment request 311 received from a client. Operations include retrieving one or more specific states from the state repository 302, executing the client request 311, sending a replication message corresponding to the client deployment request 311 to other nodes of the distributed network (or an SMR system) 300, and updating the corresponding operation logs of the one or more states in the state repository.

According to some aspects of the disclosed invention, a client deployment request may be one of three types: client dynamic deployment request, client static deployment request and client hybrid deployment request. For instance, a client request may only detail a call to a smart contract with specific arguments (the transaction input), leaving the replay log and start state ID unspecified for the replica node to determine. This deployment method is termed dynamic because the transaction's output is dynamically determined by the network, based on its order of processing in a sequential execution system or its interaction with other transactions in a concurrent execution system.

A client static deployment request, on the other hand, contains transaction input, start state ID and a full replay log. A static deployment guarantees the user to get the same output with what he simulated locally, otherwise the deployment will fail. By capturing the exact conditions under which transactions were processed, including the transaction input, the start state ID of the blockchain before the transactions were applied, and the sequence of transactions that were chosen for inclusion or exclusion (along with their ordering), a full replay log enables deterministic replay of events. Eliminating non-determinism is particularly beneficial in decentralized finance applications. This prevents blockchain nodes from manipulating the order of client deployments to gain an advantageous execution result, known as MEV (maximal extractable value).

A hybrid deployment, as the name suggests, is a hybrid of the above two and contains transaction input, start state id and a partial replay log. A partial replay log consists of truncated replay information for the initial N steps of a transaction's execution. The replica node then has the freedom to determine the execution schedule for the remaining undecided portion. This deployment method proves valuable when users seek a degree of assurance regarding the execution result while aiming to minimize conflict probability compared to a static deployment.

Back to FIG. 3, upon receiving a replication message, re-player 306 starts by fetching state information from the state repository (302) as dictated by the replication message. It then proceeds to replay the state transition based on the deterministic replay log included in the replication message. Finally, the Re-player (306) updates the operation logs for the states.

Meanwhile, the network communication/consensus module 308 monitors the message flow within the network. It identifies a set of transactions and their associated state transitions that most replica nodes agree upon and can finalize. Transactions from state t to t+1 are deemed finalized when subsequent messages cannot alter each node's decision that this list encompasses all transactions necessary to transition from state t to t+1. Subsequently, this list of transactions is forwarded to conflict resolver 310. In certain embodiments, the consensus module 308 receives replication messages from both the executor 304 and the re-player 306.

Upon receiving the list of finalized transactions, conflict resolver 310 looks at the operation logs (op logs as shown in FIG. 3) of transactions of this batch, and deterministically chooses a subset of transactions to accept and the rest to reject. The operation logs of the accepted transactions are then committed to create a new state (State t+1), which is then saved to the state repository. According to some embodiment of the present disclosed invention, a state expiry policy can be deployed to retire the oldest state, so the repository maintains N most recent states.

It is noted that under the presently disclosed invention, Executor 304, Re-player 306, Conflict-resolver 310, and Consensus 308 can all operate concurrently, utilizing available computing resources to their fullest extent, thereby making the system highly scalable.

The arrangement of modules depicted in FIG. 3 serves merely as an example to aid in understanding the system's architecture. It should be appreciated by a person skilled in the field that variations of this configuration are possible and could be equally effective. For instance, the Network Communication and Consensus Module (308) might be divided into two distinct modules. Despite this separation, they would collectively fulfill the roles and responsibilities outlined above, ensuring the system's intended performance and capabilities are maintained.

In a further embodiment consistent with the replica node architecture described in FIG. 3, each replica node comprises an executor (304), a replayer (306), a consensus module (308), and a conflict resolver (310). These modules cooperate to maintain consistency of replicated state transitions and finalized system states across the distributed network.

FIG. 4 illustrates a method for executing and committing transactions without ordering at a replica node of an SMR system according to one embodiment of the present invention. This method, shown as method 400, comprises the steps outlined below:

At step 410, the replica node receives a client deployment request. The received client request can be one of three types: client dynamic deployment request, client static deployment request and client hybrid deployment request.

Handling different types of requests. For the client dynamic deployment request, client node only sends transition input to replica node. The client dynamic deployment request doesn't specify the start state on which the transaction input should be applied. In this case, the replica node will execute the transition input contained in the request on its most updated state, generate a deterministic replay log and sends/broadcasts this log as part of the replication messages to other replica nodes.

For the client static deployment request, as discussed below, the client node itself maintains its own state copy, performs state transition based on its local state, and then generates a replay log. As such, the client static deployment request will contain the transition input, the start state ID and the complete deterministic replay log. And the client hybrid deployment request contains the transaction input, start state ID, and a partial deterministic replay log.

Regardless of the client request type, after step 410, the replica node, at step 412, executes the state transition based on the client request. Then at step 414, the replica node generates and broadcasts a replication message to the rest of the SMR system.

The generated replication message contains both a start state version identifier, transaction input and a full deterministic replay log. Replication messages and statical client deployment are conceptually the same as they removed all non-determinism of how the transaction input should be executed and allows any replica nodes who owns a copy of the specified start state to precisely replicate the state.

Separately at step 420, the replica node maintains a local state repository including the last N (N>1) versions of the SMR state (or N states).

Separately, at Step 430, the replica node receives replication messages broadcast by other replica nodes. In step 432, the replica node replays the deterministic replay logs, which are contained in the received replication messages, utilizing its local state repository.

Separately, at step 440, the replica node periodically selects a list of replication messages according to a predetermined consensus protocol such as Raft or Blocklace, with a preference for DAG-based protocols like Blocklace. This allows all nodes to agree on the same list of replication messages for each state transition from state t to t+1. Further elaboration on the consensus protocol is provided in the following discussion, particularly in relation to FIG. 9.

At step 442, the replica node then deterministically identifies a subset of transactions from the list of replication messages according to a predetermined conflict resolution protocol. In other words, each replica node analyzes the conflicts among the transactions corresponding to the selected list of replication messages for each state transition, and deterministically chooses a conflict free subset of transactions. And consensus protocol guarantees all protocol following nodes have the same list of replication messages for each state transition, even though the network may be out of sync.

At step 444, the replica node then applies these selected state transitions to construct a new state t+1, while also maintaining the most recent N versions of the state by deleting older versions.

It's important to note that the execution and replay processes, especially in step 412 and 432, are conducted on an MVCC database. These processes remain uncommitted until a consensus is achieved (Step 440) and conflicts are resolved (Step 442). Once these conditions are met, the subset of transactions is committed, and the node generates a new state, updating its local state repository accordingly. This method guarantees efficient and conflict-free transaction processing within an SMR system.

Please note that the steps outlined above, specifically steps 410, 420, 430, and 440, may occur concurrently. This concurrent execution allows for more efficient processing and streamlines workflows, enhancing the overall effectiveness and speed of the process.

Figure 5:
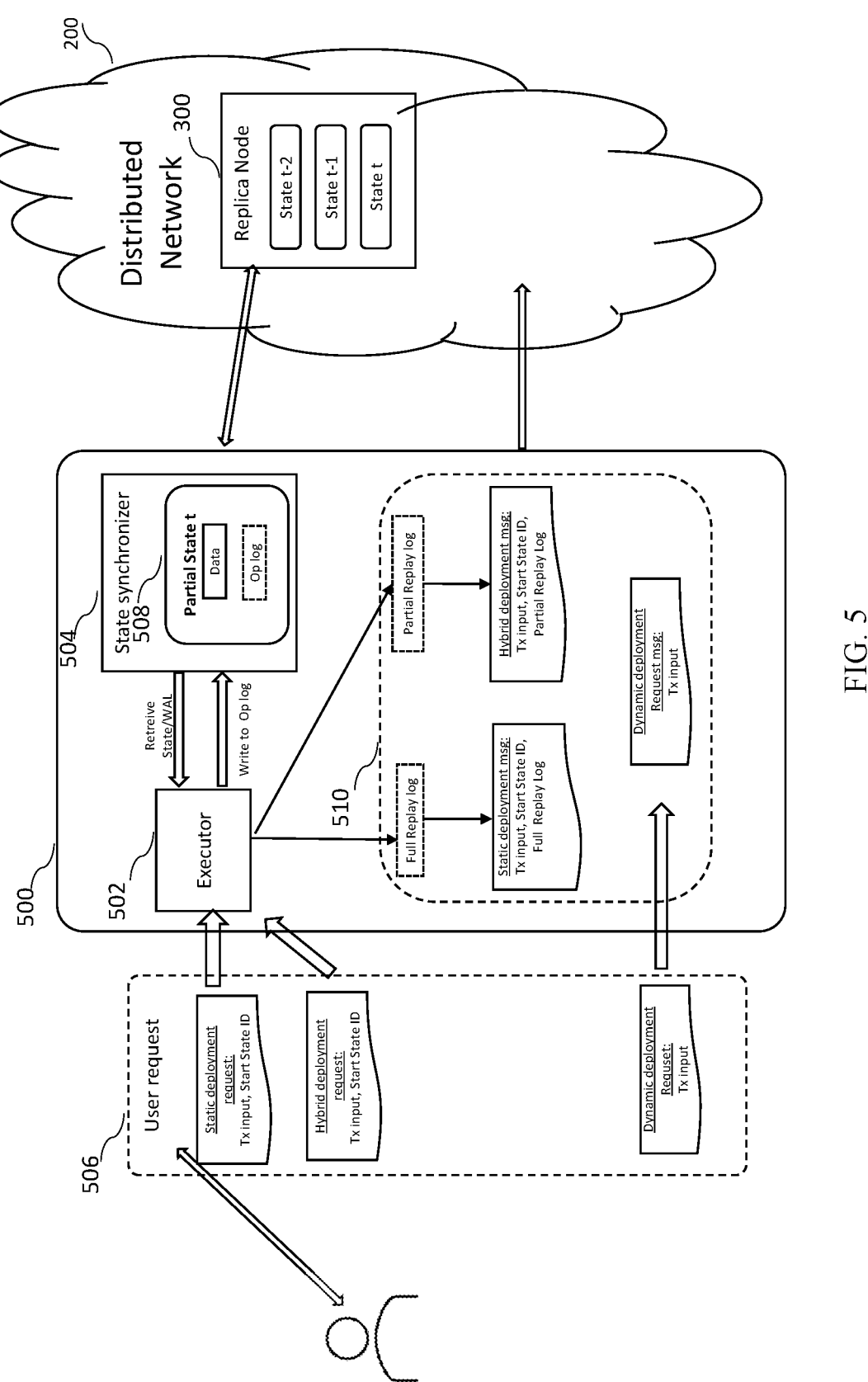
FIG. 5 illustrates an architecture of a client node according to some aspects of the present invention.

FIG. 5 illustrates an architecture of a client node according to some embodiment of the invention. The client, identified as Client 500, acts as an intermediary between the user and a distributed network (200) comprised of multiple replica nodes (300). Client 500 is equipped with two main components: an executor (502) and a state synchronizer (504).

When a user sends a transaction request (506) to the distributed network, it can be one of three types: user static deployment request, user hybrid deployment request, or user dynamic deployment request. For a user dynamic deployment request, which include transaction inputs, Client 500 can directly forward this user request, with the transaction input included, to any replica node in the network without the need for further execution or processing The choice of which start state, and exact schedule of execution of the transaction is left to the replica node to decide and the client node works only as a message re-layer.

Nonetheless, when a user submits a static deployment request or a hybrid deployment request, Client 500 undertakes further operations to facilitate and transmit the corresponding request message to the network. For example, if a user intends to purchase or sell an asset at a predefined price, the blockchain wallet, functioning as Client 500, will execute this request accordingly.

Client 500 shares similarities with replica nodes discussed above with regarding to FIG. 3, including maintaining a state repository alongside the Executor (502). Although FIG. 5 shows the state repository within the State Synchronizer (504), this configuration isn't fixed; the state repository could also be external to the State Synchronizer (504).

Crucially, Client 500 only maintains partial (as opposed to all data belonging to a state) state information in its local state repository (508), which keeps the client lightweight and efficient. The client 500 doesn't have to maintain all N latest states either. As shown in FIG. 5, only state information for state t is kept but not those of state t−2 and state t−1 that are maintained in Replica node 300, and only the data necessary to execute the client request is stored.

When executing, if Executor (502) finds that certain necessary resources are absent from its partial state repository (508), State Synchronizer (504) retrieves them from the network (200).

Like a replica node (300), Client 500 executes transaction by processing the user transaction input based on the local partial state repository, and generates a corresponding replay log to be included in a corresponding client deployment request sent to the network.

As shown in FIG. 5, this client generated replay log could be either complete or partial. In the latter case, a replica node may replay the initial segment of the transaction and then continue the execution from the last point recorded in the replay log at its discretion. For instance, suppose we want to exchange a trader's bitcoin for Ethereum at a fixed price, X, and then transfer the Ethereum to an auction contract. In this scenario, we aim to keep the first part, which is the fixed price X, as the initial fixed segment of the transaction for the replay, while leaving the method of conducting the auction, the second part, to be determined by the blockchain.

This mechanism allows users to verify and validate the deployment outcome. The use of user static or hybrid deployment requests is particularly effective in preventing replica nodes from executing transactions that could potentially be disadvantageous to the user, a concern highlighted in the context of MEV in blockchain decentralized finance (DeFi) applications.

As discussed above, the proposed system utilizes an SMR approach to manage distributed states across multiple nodes. Each node in the system can maintain not just the current version but also the last N versions of its state, where N is greater than 1, ensuring historical states are preserved for reference and recovery.

The nodes are designed to handle client requests and perform state transitions. These requests fall into three categories:

Dynamic Deployment: In this scenario, the client sends only the necessary input for state transition to a replica node, without specifying the initial state to which this input should be applied. The replica node then applies this input to its most up-to-date state version. This process yields a deterministic replay log, which is subsequently disseminated as a replication message to other nodes.

Static Deployment: Contrary to dynamic deployment, the client here maintains its own partial state copy. The client executes the state transition locally, generates a replay log, and sends this complete replication message to the replica nodes.

Hybrid Deployment: similar to static deployment, the client executes the state transition locally but only executes part of the transaction and generate a partial replay log, and sends the replication message to the replica nodes Regardless of the deployment types, replication messages propagated among the replica nodes contain: an identifier for the starting state version and a log of the deterministic state transitions.

Upon receiving a replication message, each replica node undergoes the deterministic transition log replay against its local state copy identified by the version in the message. This execution and replay take place within an MVCC database framework. Changes are held uncommitted until consensus is reached, ensuring consistency across all nodes. It's important to distinguish between two available versions: one in the state repository comprising N states, which doesn't operate on an MVCC database, and the 'working state' used for deployments structured as versioned databases. These databases facilitate lock-free updates during concurrent execution and replay by recording operation logs rather than directly performing updates on the resources.

The consensus protocol is a crucial component that enables nodes to synchronize on the same "batches" of replication messages for each state transition. While numerous consensus protocols like Raft can be employed, DAG-based protocols such as "Blocklace" are preferred for their capability to allow network to achieve higher level of concurrency.

Once a batch of transactions is confirmed via the consensus protocol, each node conducts a merge process. This involves analyzing the operation logs generated by the transitions within the current batch to resolve conflicts and deterministically selecting a subset that is conflict-free. The chosen state transitions are then applied to construct a new subsequent state, denoted as t+1.

Following this process, the system may perform garbage collection by discarding older state versions that are no longer necessary, thereby optimizing storage and resource usage within the system. This method ensures robust, consistent, and efficient state machine replication across distributed systems.

Figure 6:
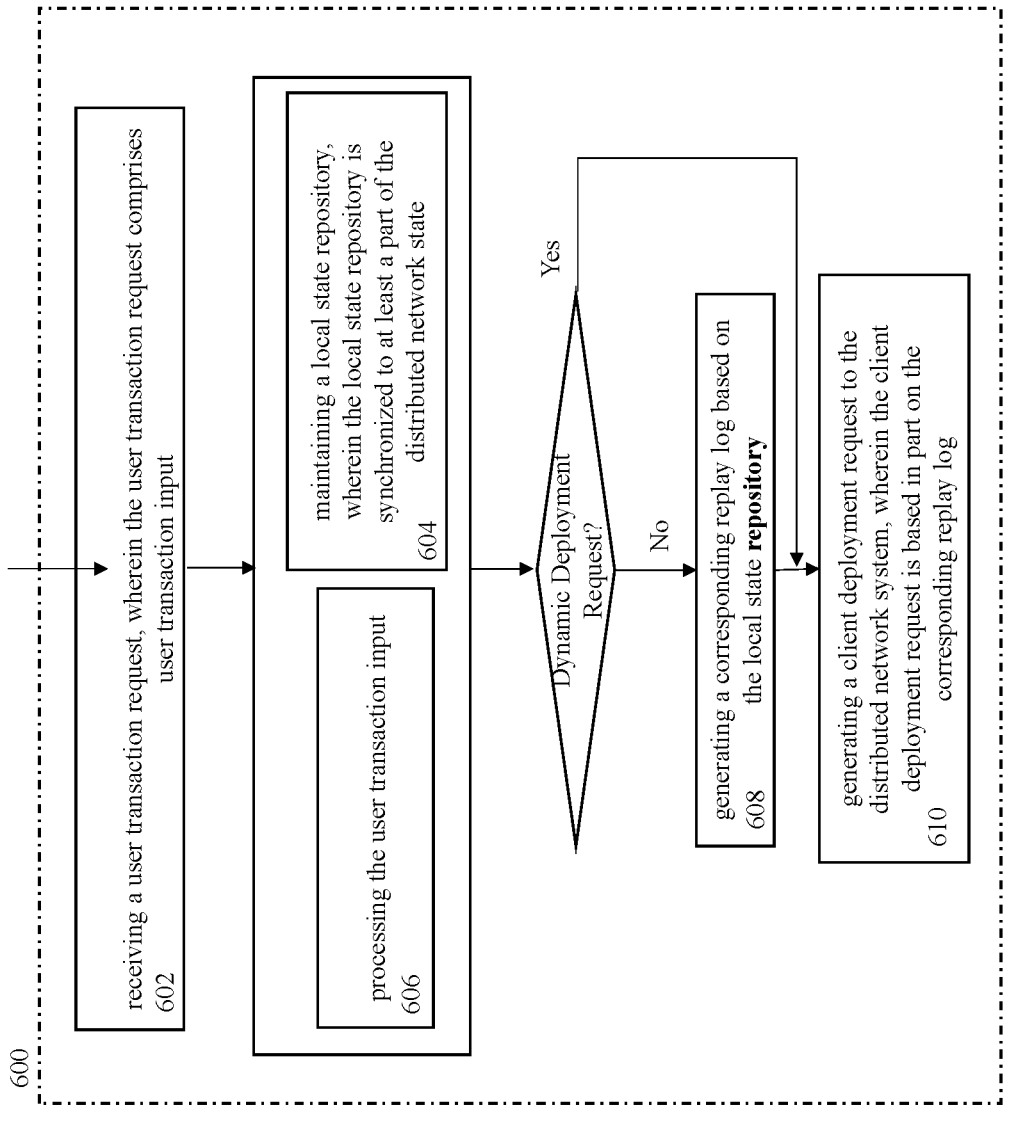
FIG. 6 illustrates a method of generating a client deployment request to an SMR system according to one embodiment of the present invention.

FIG. 6 illustrates a method of generating a client deployment request to an SMR system according to one embodiment of the present invention. It will be appreciated by those of ordinary skill in the art that one or more of the acts described may be performed by hardware, software, or a combination thereof, as may be embodied in one or more computing systems.

At step 602, a client node (for instance, client 500 as shown in FIG. 5) receives a request from a user for deployment or transaction, aiming to interact with an SMR system. This request includes input for the transaction from the user.

At step 604, the client node manages a local state repository, which is kept in sync with at least a portion of the state repository across the distributed network. This synchronization, as previously discussed in relation to FIG. 5, is performed by a synchronizer (504) of client 500. It is noted that step 604 and step 606 are not necessarily performed sequentially, they may be performed interleaved or concurrently.

At step 606, the client processes the user's request. This processing involves verifying whether the request is for a dynamic deployment. If it is, the client moves directly to step 610. Otherwise, if the request is static or a hybrid of both, the client proceeds to step 608.

At step 608, the client acts on the request using the input provided by the user, creating a replay log based on the local state repository. A complete replay log is produced for user static deployment requests. For user hybrid requests, a partial replay log is created.

At step 610, the client creates a deployment request to send to the SMR system. For dynamic deployment requests, since there is no preceding processing, the transaction input is directly incorporated into the client's request. For static or hybrid requests, the client includes both the transaction input and the replay log produced in step 608 in the deployment request. Also included in these deployment requests are the corresponding start state ID for the replay log.

As previously mentioned, the replay log produced in step 608 might be partial to prevent a replica node from executing a transaction that could be disadvantageous to the user.

As mentioned earlier, a significant limitation of conventional methodologies is that they necessitate a specific sequence (i.e., ordering) for processing transactions. In the following discussion, we delve into the mechanisms by which state transitions are executed in various embodiments of the current invention. These mechanisms effectively eliminate the requirement for transaction ordering, thereby addressing one of the critical challenges posed by traditional approaches.

MVCC play a crucial role in the present invention. In a State Machine Replication system, a distributed database ensures consistency and fault tolerance by replicating the state across multiple nodes (replicas) and ensuring that all replicas execute the same sequence of state transitions: MVCC allows each replica node in an SMR system to process multiple transactions simultaneously, providing high throughput and low latency. It ensures that each replica can independently execute read transactions without waiting for ongoing write transactions to complete. And more importantly, it allows nodes to "execute and consensus"—generate the operation logs for a state transition well before consensus is reached, allowing better utilization of resource and higher throughput.

Figure 7:
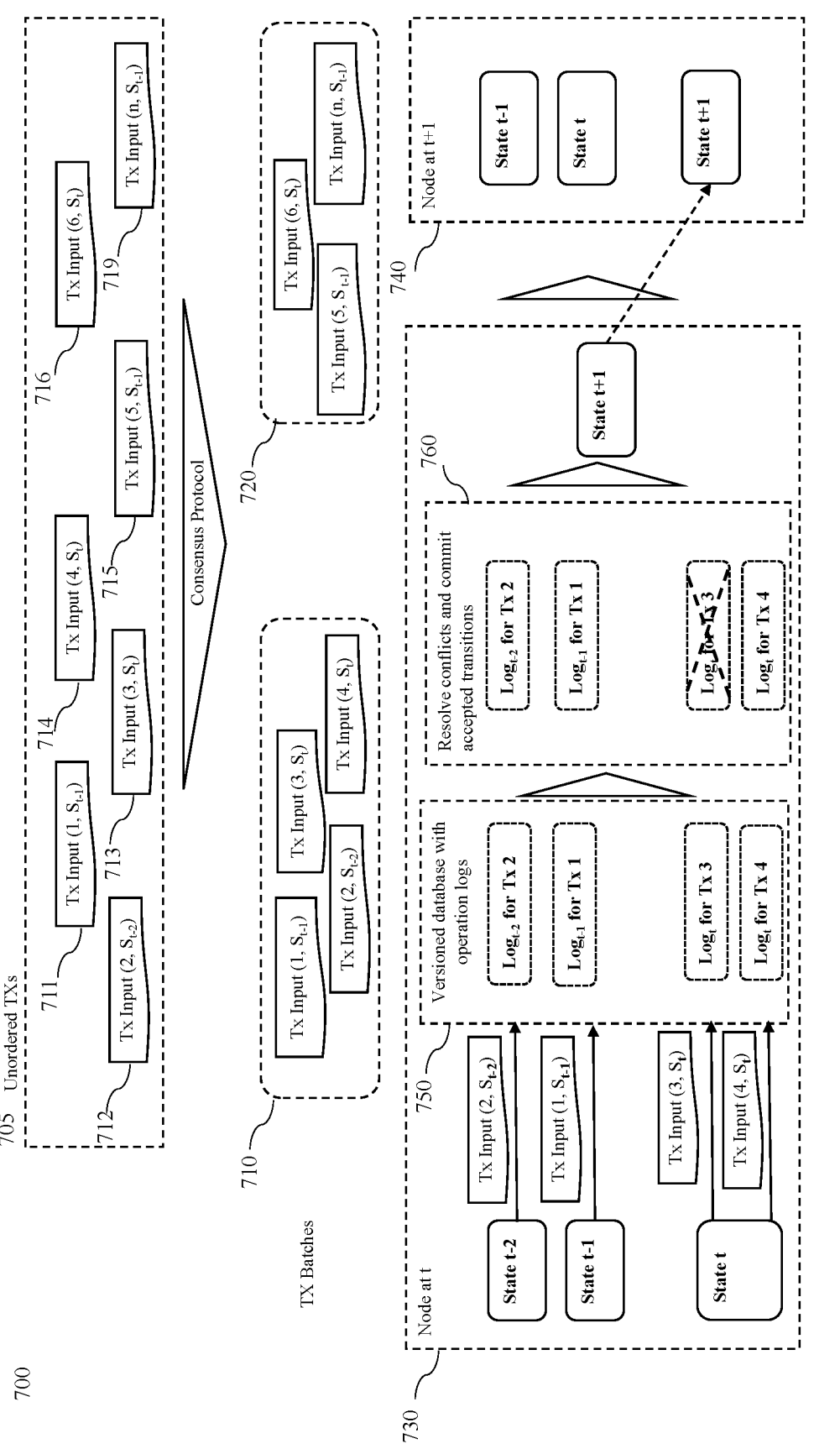
FIG. 7 illustrates a state transition scheme according to some aspects of the present invention.

FIG. 7 illustrates a state transition scheme 700 according to some aspects of the present invention. A replica node receives one or more client transaction requests (705), either directly from client nodes or through other replica nodes in the form of the replication messages. These requests correspond to a sequence of unordered transactions, numbered 711 through 719, each with distinct transaction inputs and start state IDs. For instance, "Tx Input (1, $S_{t-1}$)" denotes transaction 711, characterized by transaction input 1 and an initial state ID of $S_{t-1}$. Similarly, "Tx Input (2, $S_{t-2}$)" identifies transaction 712, with transaction input 2 and a start state ID of $S_{t-2}$. This pattern continues for the subsequent transactions in the list.

The consensus module of this replica node groups these transactions into different transaction batches according to a predetermined consensus protocol, which will be discussed in more detail below with reference to FIG. 9. As shown in FIG. 7, after grouping, one batch of transactions 710 consists of Tx Input (1, $S_{t-1}$), Tx Input (2, $S_{t-2}$), Tx Input (3, $S_t$) and Tx Input (4, $S_t$). A second batch of transactions 720 consists of Tx Input (5, $S_{t-1}$), Tx Input (6, $S_t$), Tx Input (n, $S_{t-1}$).

In FIG. 7, 730 block shows the state transition for a replica node at time t whereas 740 block shows the resulting or updated state of replica node at time t+1.

Without losing generality and for ease of illustration, assuming the replica node maintains a state repository of three states (State$_t$, State$_{t-1}$ and State$_{t-2}$). As mentioned, each state maintains operation logs for its resources. Replica node, at time t, executes each transaction in the first batch 710. As a result, in block 750 where MVCC database is shown, $Log_{t-2}$ for state t−2 is updated with transaction Tx 2 since the start state ID contained therein is $S_{t-2}$. Similarly, $Log_{t-1}$ for state t−1 is updated with transaction Tx 1, and $Log_t$ for state t is updated with the rest two transactions (Tx 3, Tx 4) of batch 710.

At the next stage, shown as block 760, conflict resolver of the replica node checks the operation logs ($Log_{t-2}$, $Log_{t-1}$ and $Log_t$) for any conflict. Examples of conflicts may include: no longer valid, a log in $Log_{t-i}$ can no longer be applied to the current state t because the resource it applies on was deleted between state t−i to t; racing, two transactions trying to update the same version of resource, or isolation violations such as write skew, and so on. A transaction identified as a conflict is rejected. The rest of the transactions are accepted, and the operation logs of the accepted transactions are then used to build the new state.

In FIG. 7, State t+1 is shown to be added in block 740, which shows the replica node with updated state repository (State t−1, State t and State t+1) at time t+1.

In a preferred embodiment of the present invention, during state 760 when resolving conflicts, different weights may be assigned to each transaction Tx. For example, in a blockchain, weight can be the gas consumed for a given transaction. Thus, by maximizing the combined weight or minimizing the total loss of the transactions, an optimized set of transactions can be committed.

Figure 8:
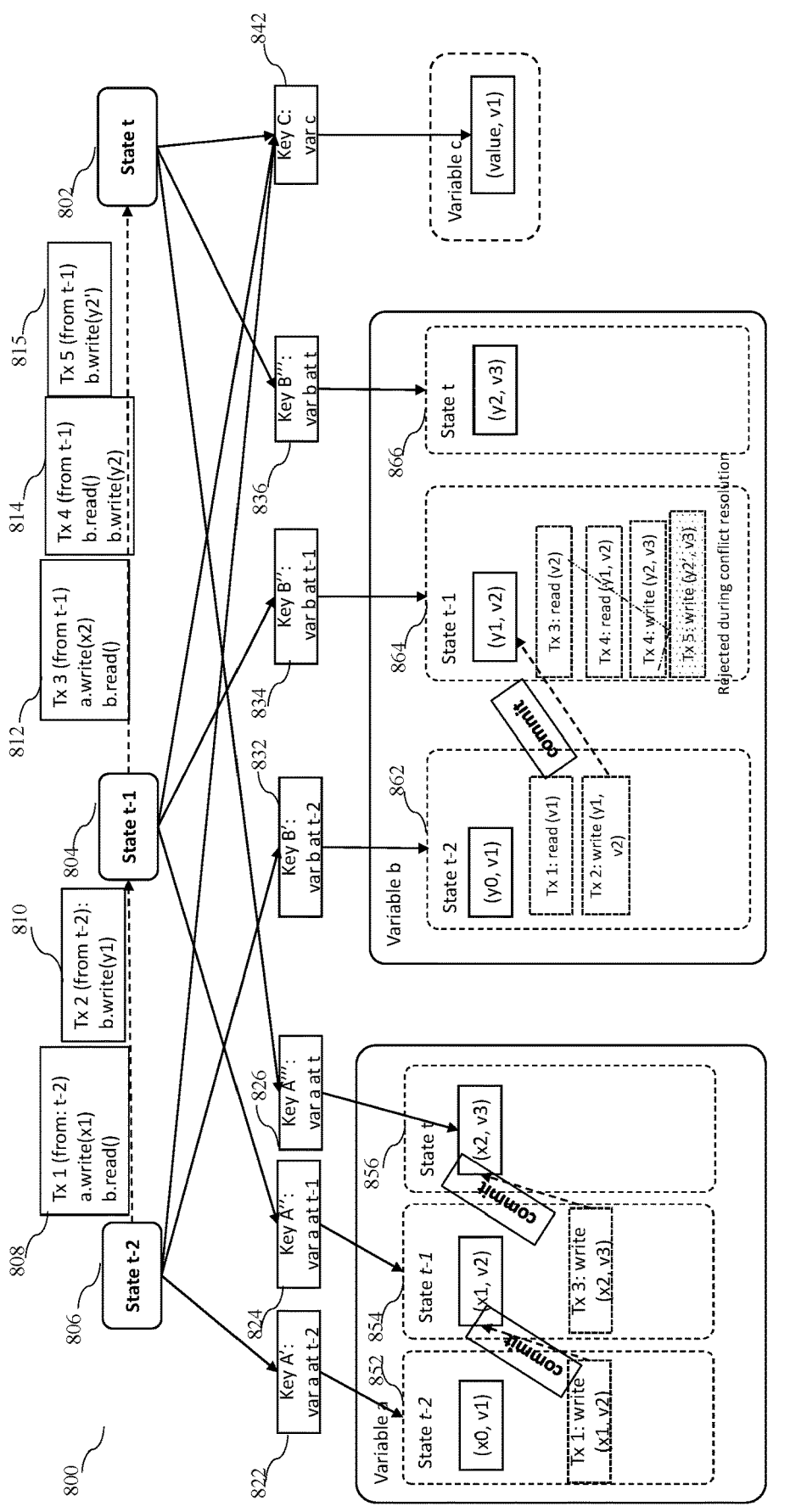
FIG. 8 illustrates a preferred implementation of state data structure organization according to some aspects of the present invention.

FIG. 8 illustrates a preferred implementation of state data structure organization (800) according to some aspects of the present invention.

According to a preferred embodiment, multiple states are organized in Merkle Patricia Tries (MPT), each state corresponds to one MPT tree root. For example, In FIG. 8, each of state t (802), state t−1 (804) and state t−2 (806) is organized in a tree structure and as a root. Transaction 808 denotes a transaction Tx1 with a.write($x_1$) and b.read( ) as transaction input and a start state ID t−2 (i.e., This TX's replay log is based on state t−2, so should be replayed on state t−2), Transaction 810 a transaction Tx2 with b.write ($y_1$) as transaction input and a start state ID t−2. Transaction 812 is transaction Tx3 with a.write($x_2$) and b.read( ) starting from state t−1, transaction 814 transaction Tx4 with b.read( ) and b.write($y_2$) starting from state ID t−1, and transaction 815 transaction Tx5 with b.write($y'_2$) starting from state ID t−1. Here, Transactions a.write( ) and b.read( ) are used to denote a request to read variable b and a request to write to variable a, respectively.

According to some embodiments, each state is represented by a collection of key-value pairs. For instance, as illustrated in FIG. 8, state t−2 (806) comprises three key-value pairs: 822, 832, and 842. The pair 822 associates Key A' with the value of variable a at state t−2, while 832 pairs Key B' with the value of variable b at the same state. Similarly, state t−1 (804) includes pairs 824, 834, and a repeated 842, with 824 updating Key A' to reflect the value of variable a at t−1, and 834 doing the same for Key B" and variable b.

Moving to the dynamics of data updates and state transition, the process is as follows: At block 852, during state t−2, variable a begins with an initial value (x0, v1) where x0 is the value of variable and v1 is the version number. This value is updated to (x1, v2) by transaction Tx1 (808) which executes a.write (x1, v2) starting from state t−2. Assuming this transaction is successfully validated and committed, a new key-value pair 824 is created for state t−1 to capture this updated value, as depicted in block 854.

Further, transaction Tx 3 (812) initiates another update with a.write(x2, v3) at state t−1, proposing a change to (x2, v3). Assuming this transaction also passes validation and is committed, the value of variable a is updated to (x2, v3) for state t, leading to the creation of a new key-value pair 826 for this state.

As another example, In FIG. 8, we observe transactions 808, 810, 812, and 814, each involving operations related to variable b. The sequence of blocks 862, 864, and 866 illustrate how conflicts influence the state of the blockchain and the updates of key-value pairs. Initially, within state t−2 as shown in block 862, variable b starts with the value (y0, v1). At this state, transaction 808 performs a b.read( ) operation, which, given b's value of (y0, v1), results in the creation of a log entry "tx1: read(v1)". Following this, transaction 810 executes a b.write(y1) operation for state t−2, updating b's value to (y1, v2). Both transactions are successfully committed, leading to the creation of a new key-value pair 834 for variable b at state t−1.

Moving to block 864, which represents state t−1, transactions 812 and 814 attempt b.write(y2, v3) and b.write(y2', v3) operations, respectively. These operations, originating from state t−1, introduce a race condition. However, during the conflict resolution process, transaction 815 (Tx5) is rejected and not committed, preventing further complications. Consequently, variable b's value is updated to (y2, v3), and a new key-value pair 836 is generated, labeled as Key B''', with variable b retaining the updated value.

Note, states of majority of the account based blockchain are organized in this way: multiple states are organized in MPT trees or their variants, each state corresponds to one MPT tree root. Data not updated during state transition are shared by pre and post roots, e.g., 842 key C and variable c in FIG. 8. Each state can be abstracted as a key-value store. If the value has been updated, a new key will be generated and added to the new state.

As discussed above, each transaction Tx creates a series of operation logs. Those logs record the read/write events on each data entry. This makes the data storage a MVCC style database. For example, in 864, the var b has multiple versions (v2->v3->v4 by Tx4 and v2->v3' by Tx5)

According to some aspects of the present invention, MVCC here is the method of concurrency control applied inside of each state: only operation logs and versions for each resource are recorded, conflicts are left to be resolved at the merge state.

According to some embodiments of the present invention, MVCC database uses snapshot isolation. At the beginning of each transaction, the database system takes a "snapshot" of the database state. This snapshot represents the state of the database at a specific point in time, including all the data items that the transaction is permitted to access. The key here is that the snapshot is consistent with the database's state at the start of the transaction, regardless of subsequent changes made by other transactions.

When a transaction reads data, it sees the version of data as it was at the time of the snapshot. This means that the transaction is isolated from concurrent updates, inserts, or deletes made by other transactions. As a result, each transaction perceives the database as if it were executing in isolation, without interference from other concurrent transactions.

Transactions under Snapshot Isolation are allowed to write to the database without waiting for other transactions to complete, leading to non-blocking write operations. However, when a transaction attempts to commit its changes, the database system checks for write-write conflicts. If another transaction has already committed a change to the same data item, the committing transaction is rolled back to maintain consistency. This process is known as "First-Committer-Wins" strategy.

Snapshot Isolation in MVCC databases represents a powerful strategy for balancing the needs for consistency, concurrency, and performance. By allowing transactions to operate on consistent snapshots, it enables systems to handle high volumes of concurrent operations while maintaining data integrity.

As discussed previously, the consensus module plays a critical role for the fault tolerance of an SMR. We next describe a proposed consensus protocol for a State Machine Replication (SMR) framework.

Figure 9:
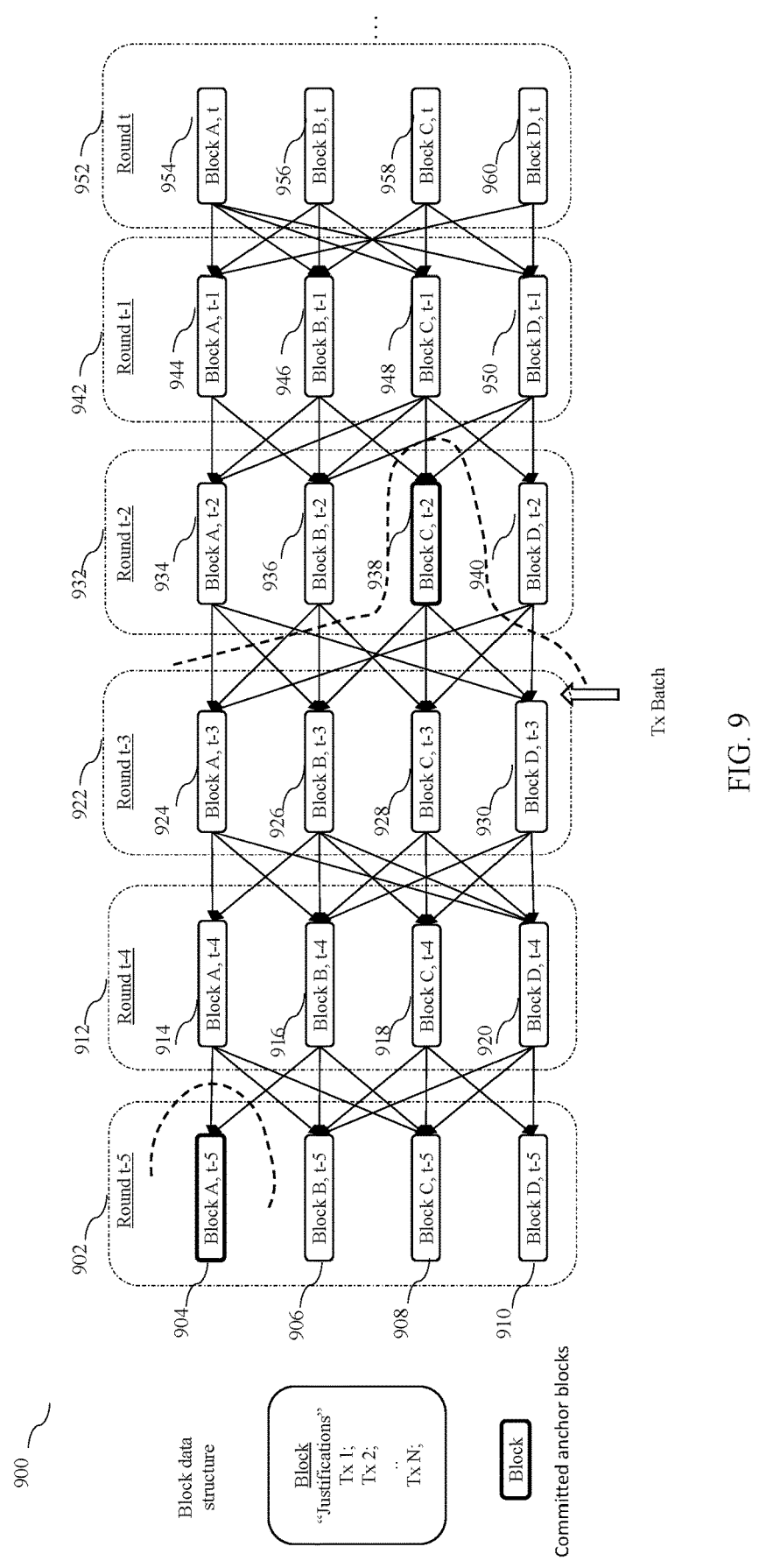
FIG. 9 illustrates a preferred implementation of a DAG based consensus protocol according to some aspects of the present invention.

FIG. 9 illustrates a preferred implementation of a DAG based consensus protocol 900 according to some aspects of the present invention.

Unlike other SMR systems where consensus protocol helps replica nodes to reach an agreement of a total or partial order of Transactions, the proposed consensus protocol here only requires nodes to agree on "batches of Transactions."

Many existing consensus protocols can be modified to achieve this. The preferred implementation is a concurrent and leaderless consensus protocol where all replica nodes can concurrently propose new transactions.

As shown in FIG. 9, specific anchor blocks are identified in each round. Also a safety oracle (not shown) is required to assess whether these anchor blocks are firmly committed. For an in-depth explanation of how the safety oracle operates and how anchor blocks are selected, refer to "The Blocklace: A Universal, Byzantine Fault-Tolerant, Conflict-free Replicated Data Type" authored by Paulo Sérgio Almeida and Ehud Shapiro as safety oracle and selection of anchor blocks are not part of the claimed invention here.

A block is a fundamental data structure for the consensus protocol implementation. Unlike traditional blockchain where blocks form a single linear chain with each block directly linked to its predecessor, in a DAG-based system, blocks are nodes in a directed acyclic graph. This means each block can have multiple parents and multiple children, allowing for greater parallelism and scalability. A block typically contains a header and a list of transactions or transaction batches. The header of a block includes metadata such as the block's hash, the hashes of its parent blocks, and possibly a timestamp or a nonce. The list of transactions or transaction batches are the actual data or operations the block is confirming or executing within the network.

A DAG-based consensus protocol enables all replica nodes within a network to produce blocks simultaneously. In this model, each node incorporates blocks that they have received into the blocks they are producing. To ensure orderly progress and prevent chaos, the protocol imposes synchronization constraints. For instance, a rule may stipulate that a replica cannot generate new blocks unless it has received blocks from at least one-third of the other replicas in the network. These synchronization constraints naturally organize the DAG into a stratified structure, with each distinct level representing a 'round' in the consensus process. During each round, two primary activities occur: first, the creation of new blocks, which typically encapsulate batches of transactions, and second, the selection of parent blocks. These parent blocks are the ones to which the newly created blocks will be linked, establishing a coherent and orderly chain of blocks within the DAG structure. This mechanism ensures that despite the concurrent production of blocks, the overall system remains structured and consistent, facilitating a reliable and scalable consensus mechanism.

In DAG-based consensus protocols, anchor blocks serve as crucial reference points throughout the network. Validators examine their local view of the DAG to determine if consensus has been reached on committing a specific anchor block. Achieving consensus on an anchor block signifies that it, along with all preceding blocks in its lineage, is accepted as confirmed and irreversible by the network. This process is essential in achieving consensus on the system's state and for establishing agreement across all nodes regarding the transactions that have been executed and their sequential order. Using anchor blocks, the system ensures consistency and reliability in recording transactions, facilitating a unified and tamper-proof ledger.

In FIG. 9, at Round t–5 (902), there are four blocks (904-910): Block (A, t–5), Block (B, t–5), Block (C, t–5) and Block (D, t–5), where Block (A, t–5) (904) is an anchor block. How anchor blocks are decided in a DAG depends on the specific protocols used. For instance, the synchronized version of Blocklace applies a shared random coin to choose an anchor block. At Round t–5, this anchor block is not committed yet. With the arrival of blocks in rounds t–4, t–3, t–2, . . . (FIG. 9, 912, 922, 932, 942, 952, . . . ), at a certain stage, the anchor block, identified as block 904, is deemed committed. This status is achieved when enough validators have observed Block (A, t–5) and have cast their votes in favor of it. The detailed decision rule for anchor block commitment depends on the specific protocols implemented.

Similarly, assuming Block (C, t–2) (938) is another anchor block and has been committed by blocks at some point in round t–1, t, . . . . As such, the consensus protocol has found an incremental batch of blocks, defined as (C, t–2)'s ancestors, excluding the previous anchor block's ancestor set (i.e., (A, t–5)'s).

In traditional blockchain systems, after the consensus protocol finds an incremental block batch, all blocks in the batch are sorted using topological sort. As a result, all transactions in the batch are sorted in a total order. Now validators start to execute the transactions according to the total order to generate the next state.

A significant innovation of this protocol, compared to existing round-based DAG protocols, is the elimination of the need for topological sorting to establish a total order of the blocks after deciding on an anchor block. This allows blocks to be replayed and validated well before an anchor block is committed and allows much better use of the computational resources.

Another important aspect of the disclosed invention repeatedly referred to above is a deterministic replay log for the replica nodes to deterministically replay transactions or events.

Figure 10:
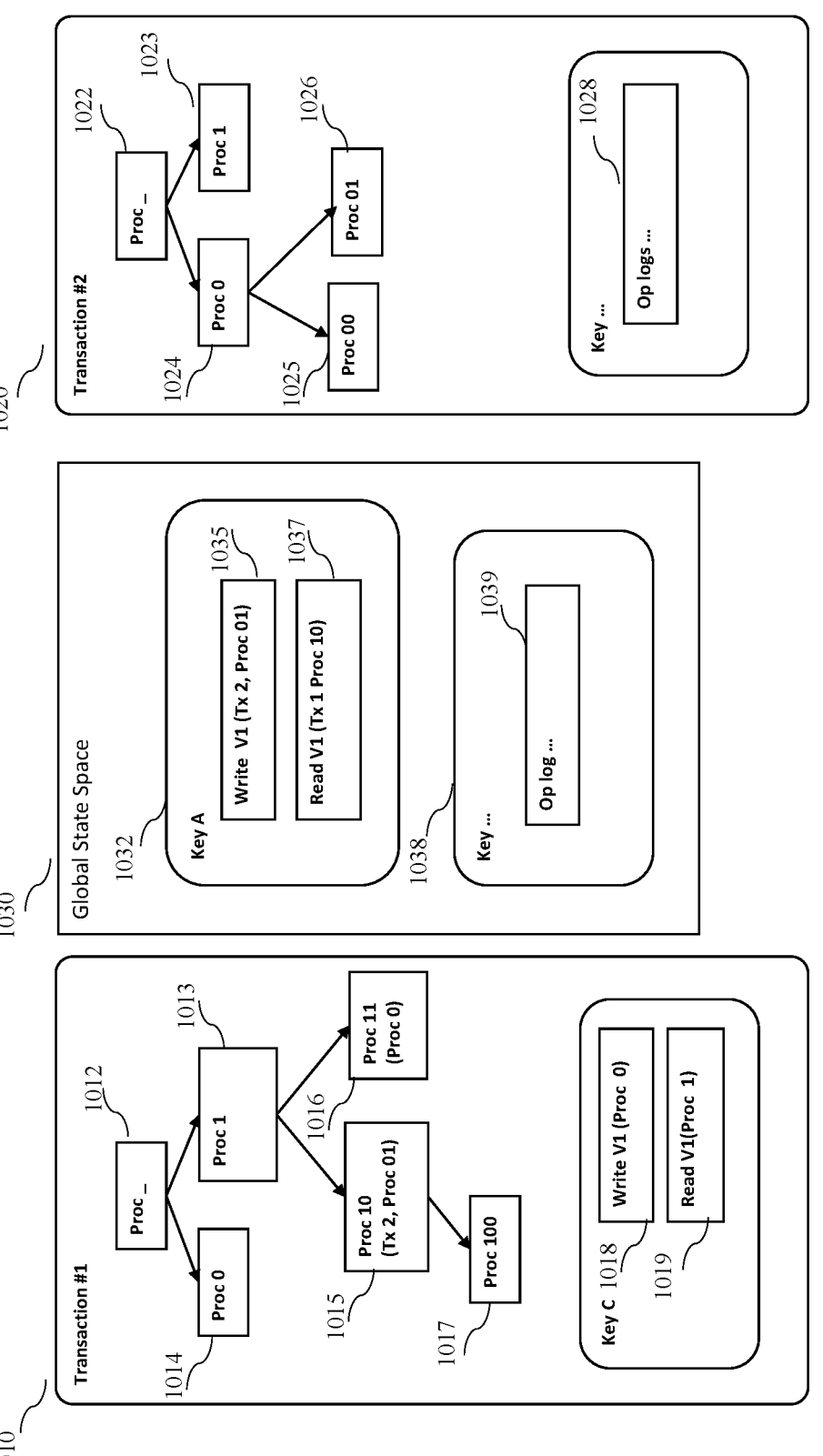
FIG. 10 illustrates a preferred implementation of a deterministic replay according to some aspects of the present invention.

FIG. 10 illustrates a preferred implementation of a deterministic replay log according to some aspects of the present invention.

Each transaction is executed in code blocks called "procedures" (the term is borrowed from pi calculus), where each procedure is assigned a unique ID. In the preferred embodiment, the execution of a transaction creates a series of procedures forming a tree structure, with the completion of one procedure generating zero or several children procedures. Here each procedure's ID can be encoded by a binary string (prefix) to show its location in the tree. For example, in block 1010, Transaction #1 starts with an initial procedure proc_(the root) (1012), upon the completion of which two child procedures are spawned: proc 0 (1014) and proc 1 (1013). The completion of proc 1's execution spawns proc 10 (1015) and proc 11 (1016). In block 1020, transaction #2 has procedures 1022 through 1026 in a similar binary tree structure.

Each procedure can access the shared global state (1030), which is created from the replica node's state repository, or access that transaction's local state which is exclusive to that transaction. For example, states 1018 and 1019 are exclusive to Transaction #1, and 1028 exclusive to Transaction #2.

There are synchronizations between procedures, for instance in block 1016, proc 11 needs to synchronize with proc 0 in the same transaction, meaning proc 11 needs the output of proc 0 to proceed. Similarly, in block 1015 proc 10 needs the output from proc 01 of transaction #2 to proceed. Any required synchronization between procedures within a transaction, or between procedures across transactions, will be recorded in by the corresponding procedure's ID. The synchronization information is recorded on each unique procedure, forming a binary tree like structure (we call replay tree). An example of such a replay tree is 1012, 1013, 1014, 1015, 1016 and 1017 as shown in FIG. 10.

Optimization can be done if a procedure's access is guaranteed to be deterministic (for instance, accessing a read-only resource), in this case, since the execution is deterministic, this operation doesn't need to be recorded in the replay log.

A replay log capturing the replay tree is thus created following the above execution procedures. There are some space efficient data structures to record this tree, for example, radix tree.

For replaying transactions based on the replay log, as illustrated in FIG. 10, the process begins with a root procedure. This procedure is associated with a pointer that identifies the starting point at the root of the replay tree. The root procedure may initiate with input/output operations or may generate new procedures. As additional procedures are spawned, each is assigned a unique pointer that links it to a specific location within the replay tree. If an entry in the replay tree indicates that synchronization with another procedure is necessary, the affected procedure will enter a suspended state. It will remain in this state until the other procedure is completed, at which point it can continue its execution.

The division of steps in these methods is for clarity of description. In implementation, they can be combined into one step or further divided into multiple steps, as long as they maintain the same logical relationship. Any minor modifications or non-essential additions to the algorithm or process that do not change its core design are within the scope of this patent.

Those skilled in the art will appreciate that the above embodiments are specific implementations of this application, and various modifications can be made in form and detail in actual applications without departing from the spirit and scope of this application.

What is claimed is:

1. A computer-implemented method, performed by a distributed network system comprising a plurality of computing nodes, comprising:

Maintaining, by at least one computing node, a state repository that stores at least N previous versions of system states, where N>1, to facilitate recovery from node failure and maintain consistency among the plurality of computing nodes;

Receiving, at a first computing node, a client deployment request;

Generating, by the first computing node-based on the client deployment request, a first replication message;

Transmitting, by the first computing node, the first replication message to one or more other computing nodes of the distributed network system;

Receiving, at the first computing node, a second replication message from a second computing node and executing the second replication message;

periodically selecting, by the first computing node or the second computing node, a list of replication messages according to a predefined consensus protocol;

deterministically selecting, by the first computing node, a subset of transactions from the list of replication messages according to a predefined conflict resolution protocol; and committing, by the first computing node, the subset of transactions to the state repository.

2. The method of claim 1, wherein the state repository is further configured to employ a state expiration policy to discard system state older than the last N versions.

3. The method of claim 1, wherein the state repository is implemented as multi-version database.

4. The method of claim 1, wherein the predefined consensus protocol is a Byzantine fault-tolerant protocol.

5. The method of claim 1 wherein the first replication message includes a state transition log that records changes to a system state.

6. The method of claim 1, wherein the first replication message includes a snapshot comprising incremental transition information relative to a previous checkpoint.

7. The method of claim 3, wherein each state transition is executed in a multi-version concurrency control (MVCC) enabled database with snapshot isolation.

8. The method of claim 1, wherein generating the first replication message and replaying the second replication message are performed concurrently by the first computing node.

9. A computer-implemented method for enabling a client application to interact with a distributed network system, comprising:

receiving, by a client-side computing device, a user transaction request to interact with the distributed network system, the user transaction request comprising user transaction input;

maintaining, by the client-side computing device, a local state repository, the local state repository being synchronized with at least a portion of the distributed network repository maintained by the distributed network system;

processing the user transaction input based on the local state repository;

generating, by the client-side computing device, a replay log that records one or more state transitions resulting from the processed transaction input; and generating a client deployment request for transmission to the distributed network system, wherein the client deployment request is based at least in part on the replay log.

10. The method of claim 9, wherein a user interface is provided for a user to verify the replay log.

11. The method of claim 9, wherein the replay log comprises a partial set of operations associated with the user transaction input.

* * * * *